United States Patent
Zhang et al.

(10) Patent No.: US 6,828,270 B1
(45) Date of Patent: Dec. 7, 2004

(54) SUPPORTED CATALYST FOR PRODUCING SYNDIOTACTIC STYRENIC POLYMER WITH HIGH PRODUCTIVITY AND SIGNIFICANTLY REDUCED REACTOR FOULING

(75) Inventors: Xuequan Zhang, Taejeon (KR); Sung-Cheol Yoon, Seoul (KR); Jae-Gon Lim, Taejeon (KR); Young-Sub Lee, Taejeon (KR)

(73) Assignee: Samsung Atofina Co. Ltd. (KR)

( * ) Notice: Subject to any disclaimer, the term of this patent is extended or adjusted under 35 U.S.C. 154(b) by 467 days.

(21) Appl. No.: 09/678,171

(22) Filed: Oct. 2, 2000

(30) Foreign Application Priority Data

Aug. 7, 2000 (KR) ........................................ 2000-45602

(51) Int. Cl.[7] .......................... B01J 31/00; B01J 37/00; C08F 4/02; C08F 4/60
(52) U.S. Cl. ...................... 502/159; 502/103; 502/117; 502/527.12
(58) Field of Search ................................ 502/159, 103, 502/117, 527.12

(56) References Cited

U.S. PATENT DOCUMENTS

| | | | | |
|---|---|---|---|---|
| 4,235,748 A | * | 11/1980 | Berchielli et al. | 252/430 |
| 4,483,940 A | * | 11/1984 | Ono et al. | 502/159 |
| 4,579,689 A | * | 4/1986 | Hershman et al. | 502/159 |
| 4,719,145 A | * | 1/1988 | Neely | 502/159 |
| 5,210,059 A | * | 5/1993 | Matturo et al. | 502/159 |
| 5,240,894 A | * | 8/1993 | Burkhardt et al. | 502/117 |
| 6,211,113 B1 | * | 4/2001 | Harth et al. | 502/527.12 |
| 6,228,796 B1 | * | 5/2001 | Arakawa et al. | 502/159 |
| 6,294,498 B1 | * | 9/2001 | Darcissac et al. | 502/159 |
| 6,440,895 B1 | * | 8/2002 | Tonkovich et al. | 502/527.12 |
| 6,479,428 B1 | * | 11/2002 | Tonkovich et al. | 502/527.12 |

OTHER PUBLICATIONS

US 2002/0013217 A1, US Pre–Grant publication to Herrmann et al., published Jan. 2002, US class 502/159.*
US 2002/0086796 A1, US Pre–Grant publication to Eckardt et al., published Jul. 2002, US class 502/527.12.*
US 2002/0183404 A1, US Pre–Grant publication to Schwarz et al., published Dec. 2002, US class 502/159.*
US 2003/0007904 A1, US Pre–Grant publication to Tonkovich et al., published Jan. 2003, US class 502/527.12.*
US 2003/0027718 A1, US Pre–Grant publication to Nordquist et al., published Feb. 2003, US class 502/159.*

Kaminsky, W,, et al., "Polymerization of styrene with supported half–sandwich complexes," *J. Polym. Sci.: Part A Polym. Chem.*, 1999, 37, 2959–2968.

Soga, K., "Highly isospecific heterogeneous metallocene catalysts activate ordinary alkylaluminuims," *Stud Surf. Sci. Cat.*, Mar. 10–12, 1994, 89, 307–315.

Pasquet, V., et al., "Improvement of supported catalysts for syndiotactic polymerization of styrene," *Macromol. Chem. Phys.*, 1999, 200, 1435–1457.

Yu, G., et al., "Polymer–supported titanium catalysts for syndiotactic polymerization of styrene," *J. Polym. Sci.: Part A: Polym. Chem.*, 1996, 34, 2237–2241.

* cited by examiner

*Primary Examiner*—Mark L. Bell
*Assistant Examiner*—J. Pasterczyk
(74) *Attorney, Agent, or Firm*—Woodcock Washburn LLP

(57) ABSTRACT

The supported catalyst according to the present invention comprises a support of organic or inorganic powder with a high-surface area, a polymer coated onto the support and a metallocene catalyst. The polymer (1) contains polar groups; (2) interacts with the surface of the support; and (3) is insoluble in the styrenic monomer or polymerization solvent during polymerization after the catalyst is loaded. The polymer is located between the support and the metallocene catalyst such that the polymer insulates the metallocene layer from the support layer to prevent poisoning of the metallocene catalyst layer by the support layer. The styrenic polymer powder such produced by the present invention has good flow-ability and good morphology demonstrating a great deal of industrial applicability.

19 Claims, 1 Drawing Sheet

SUPPORTED CATALYST FOR PRODUCING SYNDIOTACTIC STYRENIC POLYMER WITH HIGH PRODUCTIVITY AND SIGNIFICANTLY REDUCED REACTOR FOULING

FIELD OF THE INVENTION

The present invention relates to a supported catalyst for producing a styrenic polymer having a syndiotactic configuration. More particularly, the present invention relates to a supported catalyst which is used to prepare a syndiotactic styrenic polymer with high productivity and with significantly diminished reactor fouling when a stirring-tank reactor is employed.

BACKGROUND OF THE INVENTION

Syndiotactic polystyrene (sPS) was first synthesized in 1985, using the homogeneous organometallic catalytic system based on a titanium compound and methylaluminoxane (MAO). Syndiotactic polystyrene is a very attractive polymer. The polymer shows a low specific gravity, a low dielectric constant, a high modulus of elasticity and an excellent resistance to chemicals. Accordingly the syndiotactic polystyrene has become a promising material for various applications in the automotive, electronic and packaging industries.

A large number of patents on this subject have been filed in recent years. The early patents were dedicated to the synthesis, particularly to the nature of the catalyst and the later patents to the cocatalyst and the other minor components. Then the problems of the polymerization process were more and more addressed.

In the commercialization of syndiotactic polystyrene, problems, such as serious reactor fouling, and low flowability of the product powder resulted from unsatisfactory morphology, remain unsolved if a homogeneous catalyst is used when a stirring-tank reactor is employed. To solve these problems, two alternative routes seem to be possible: (a) specially designed reactor, and (b) catalyst supported on insoluble solid. The reactor design is not in the scope of this patent and what to be concerned here is the supported catalyst system.

The activity of a supported metallocene catalyst is, generally, much lower than that of the corresponding homogeneous catalyst by the order of magnitude of 2–3. The polymerization activity of syndiotactic styrene is, generally, much lower than that of polyolefin. Therefore it is very difficult to prepare a supported catalyst having acceptable activity for producing a syndiotactic polystyrene. In order to have the high activity and polymerization efficiency similar to the homogeneous catalyst, the supported catalyst should maintain the basic metallocene structure, and in order to prevent fouling, the catalyst should not be separated from the support At) during polymerization.

So far, four basic methods have been developed for metallocene catalyst systems for production of polyolefin as follow:

1. direct adsorption of metallocene into the support surface involving physisorption or chemisorption of metallocene (direct heterogenization);
2. initial adsorption of methylaluminoxane (MAO) into the support, followed by adsorption of metallocene (indirect heterogenization);
3. covalent bonding of metallocene to a carrier by a ligand, followed by activation with MAO; and
4. use of an organic compound which is able to react with the hydroxyl group of an inorganic support surface such as silica and to form a complex with metallocene to be supported, which is represented by the following reaction as one example:

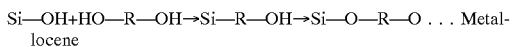
Si—OH+HO—R—OH→Si—R—OH→Si—O—R—O . . . Metallocene where R is a hydrocarbon compound.

Either direct loading of a metallocene catalyst on a support (Method 1) or indirect loading on a MAO treated support (Method 2) does not provide a good activity for styrenic polymerization. Method 3 relates to a complex chemistry and difficulties arise when bonding the metallocene to the support surface (Soga, Stud Surf .Sci. Cat. 1994, 89, 307). A spacer between support and metallocene was introduced in Method 4, but the results, as reported by Spitz et al. (Macromol. Chem. Phys. 1999, 200, 1453), show that there is no any enhancement of styrene polymerization activity.

Until now, very few reports can be seen in the area of supported catalyst for producing syndiotactic polystyrene. Silica (Kaminsky et al., J. Polym. Sci.: Part A: Polym. Chem. 1999, 37, 2959), alumina (Spitz et al., Macromol. Chem. Phys. 1999, 200, 1453) and polymer (Yu et al., J. Polym. Sci.: Part A: Polym. Chem. 1996, 34, 2237) have been used as a support for preparation of a supported catalyst for producing syndiotactic polystyrene. Unfortunately, all these supported catalysts are not applicable because of extremely low activity. Therefore, a supported catalyst with high activity for producing syndiotactic styrenic polymer is highly expected. The present inventors have developed a supported catalyst with high activity, which is used to prepare a syndiotactic styrenic polymer with high productivity and with significantly diminished reactor fouling when a stirring-tank reactor is employed.

OBJECTS OF THE INVENTION

A feature of the present invention is the provision of a supported catalyst with high activity for preparing syndiotactic styrenic polymer.

Another feature of the present invention is the provision of a supported catalyst with high activity for preparing syndiotactic styrenic polymer with high productivity.

A further feature of the present invention is the provision of a supported catalyst with high activity for preparing syndiotactic styrenic polymer, which can significantly diminish reactor fouling when a stirring-tank reactor is employed.

A further feature of the present invention is the provision of syndiotactic styrenic polymer powder with good flowability and morphology.

The above and other objects and advantages of this invention will be apparent from the ensuing disclosure and appended claims.

SUMMARY OF THE INVENTION

The supported catalyst according to the present invention comprises (A) a support of organic or inorganic powder with a high-surface area, (B) a polymer coated onto the support and (C) a homogeneous transition metal compound as essential component, the polymer (B) functioning an insulation layer between the support and the metal compound. The supported catalyst can contain optionally (D) alkyl aluminoxane and/or (E) alkyl aluminum compound. By using the supported catalyst provided by the present invention, the productivity of styrenic polymer is much increased and the reactor fouling was significantly reduced. The supported catalyst can be used in combination with a cocatalyst, preferably an alkyl aluminoxane. The styrenic polymer powder such produced by the present invention has good flow-ability and good morphology demonstrating a great deal of industrial applicability.

DETAILED DESCRIPTION OF THE INVENTION

It is believed that the key point to obtain a high activity metallocene supported catalyst is to keep the metallocene catalyst to be supported from the poisonous surface of the support without deterioration of the advantages of the supported catalyst.

In Method 4 above, an organic compound reacts with hydroxyl groups, or Si—OH groups in case of silica, of the surface of a support and can form a reactive complex with metallocene. However, the method is not effective because, even though the hydroxyl groups of the support are capped, the non-hydroxyl group area of the surface of the support (—SiO—Si—, in case of silica) still remains bare, and the bare acidic surface is poisonous to the catalyst.

Figure 1:
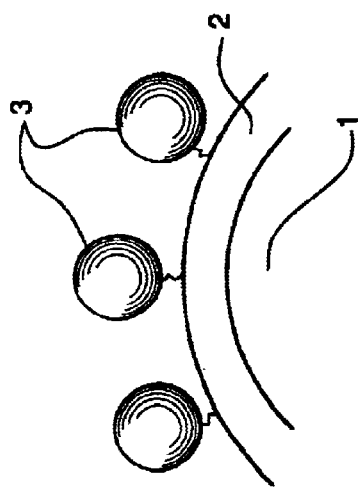
FIG. 1 is a schematic drawing illustrating insulation concept of the supported catalyst according to the present invention by the insulation layer of polymer between the support and the metallocene.

With this thought in mind, the present inventors have used a polymer to completely insulate the homogeneous catalyst to be supported from the poisonous surface of the support, thereby functioning as an insulation layer between the catalyst and the support. To constitute an insulation layer, the polymer should be harmless to catalyzation performance, have chemical or physical interaction with the catalyst and support, and be insoluble in the styrenic monomer or polymerization solvent after the catalyst is loaded. FIG. 1 is a schematic drawing illustrating insulation concept of the supported catalyst according to the present invention by the insulation layer of polymer 2 between the support 1 and the metallocene catalyst 3.

The binuclear catalyst is represented by the following formula (C), (D) or (E):

The polymers to meet the requirements described above are those containing particular polar groups. The particular polar groups of the polymer interact chemically or physically with the surface of a support. Accordingly the polymer can be completely absorbed on the surface of the support to form an insulation film, somewhat like a coating process.

While the insulation layer is formed, the polar groups absorb metallocene catalyst to be supported by formation of a stable complex, and act as a media or a substitute for support to load the homogeneous catalyst. With the insulation layer on the surface of the support, the intrinsic characteristic of the support become not so important as it used to be and the support itself only provides the morphology and high surface area of the supported catalyst. This may lead to the following significant changes on the level of basic concept of the support catalyst:

(1) The treatment of an inorganic support can be conducted more easily at more mild conditions because the chemical properties of the support surface are sheltered by the insulation layer, and (2) An organic polymer powder such as a neucent polyolefin powder, which possesses high surface area and good morphology but is not able to load metallocene catalyst because of the non-polar nature, can be used as a catalyst support. Because the insulation layer on the support surface can load the metallocene catalyst.

As shown in FIG. 1, a polymer is used to form an insulation layer 2 on the surface of a support 1. Representative polymers suitable for this purpose include acrylonitrile-containing polymers and copolymers, hydroxyl group-containing polymer and copolymers, acrylic and acrylate polymers and copolymers, maleic anhydride-containing copolymers and maleic anhydride modified polymers, acetate containing polymers and copolymers, polyethers, polyketones, polyamide polymer and copolymers, and polyurethanes.

Specific examples of the acrylonitrile-containing polymers and copolymers are polyacrylonitrile, poly (acrylonitrile-block-styrene), poly(styrene-co-acrylonitrile), acrylonitrile-butadiene-styrene resin, poly(acrylonitrile-co-butadiene), poly(acrylonitrile-co-isoprene), etc. The acrylonitrile content in the copolymers is not specifically limited, but is usually about from 0.1 to 100% by weight, preferably about from 2 to 50% by weight. Specific examples of hydroxyl group-containing polymer and copolymers are poly(vinyl alcohol), and hydroxyl group functionalized polymers and copolymers.

The amount of polymer 2 for the insulation layer is not limited, but is preferably in the range of about 0.0001 to 99.999% by weight as per the supported catalyst. The support 1 used for preparation of the supported catalyst according to the present invention includes both inorganic supports and organic supports. The representative examples of the inorganic supports include silica gel, alumina, silica-alumina gel, zeolite, mica powder, clays, molecular sieves, metal oxide compounds, metal halogenides, metal carbonates and metal powder. Silica gel, silica-alumina gel and alumina are most preferable among the inorganic solids.

The representative examples of the organic supports include poly(styrene-co-divinylbenzene) beads, starch powder and polyolefin powder. The polyolefin powder includes polyethylene powder, polypropylene powder, olefin copolymer powder, etc.

The amount of support 1 is not limited, but is preferably in the range of about 0.0001 to 99.999% by weight as per the supported catalyst. Preferably the support is used over 70% by weight as per the supported catalyst.

The transition metal compound used as a homogeneous catalyst in the present invention is a Group IVB metal compound represented by the following formula (A) or (B):

$$MR^1_a R^2_b R^3_c X_{4-4(a+b+c)} \quad (A)$$

$$MR^1_d R^2_e X_{3-(d+e)} \quad (B)$$

where M is an atom of Group IVB, $R^1$, $R^2$ and $R^3$ are a hydrogen atom, an alkyl group having 1 to 20 carbon atoms, an alkoxy group having 1 to 20 carbon atoms, an aryl group having 6 to 20 carbon atoms, an alkylaryl group having 6 to 20 carbon atoms, an arylalkylgroup having 6 to 20 carbon atoms, an aryloxy group having 1 to 20 carbon atoms, a cyclopentadienyl group, a substituted cyclopentadienyl group or an indenyl group, X is a halogen atom, a, b and c are an integer of 0 to 4, and d and e are an integer of 0 to 3.

Representative examples of the alkyl group having 1 to 20 carbon atoms as represented by $R^1$, $R^2$ or $R^3$ are a methyl, an ethyl, a propyl, a butyl, an amyl, an isoamyl, an isobutyl, an octyl and a 2-ethylbexyl.

Representative examples of the alkoxy group having 1 to 20 carbon atoms are a methoxy, an ethoxy, a propoxy, a butoxy, an amyloxy, a hexyloxy and a 2-ethylhexyloxy.

Representative example of the aryl, alkylaryl or arylalkyl having 6 to 20 carbon atoms are a phenyl, a tolyl, a xylyl and a benzyl.

In the general formulae (A) and (B), $R^1$, $R^2$ and $R^3$ may be the same or different one another.

The transition metal component used for preparation of the supported catalyst according to the present invention further includes, besides single nuclear catalysts as represented in formula (A) or (B), binuclear and multiple-nuclear catalysts as well.

The binuclear catalyst is represented by the following formula (C), (D) or (E):

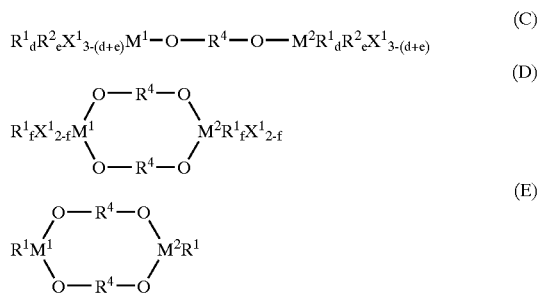

where $M^1$ and $M^2$ are an atom of Group IVB; and $R^2$ are an alkyl group having 1 to 20 carbon atoms, an aryl group having 6 to 20 carbon atoms, an alkylaryl group having 6 to 20 carbon atoms, an arylalkyl group having 6 to 20 carbon atoms, a cyclopentadienyl group, a substituted cyclopentadienyl group or an indenyl group; $R^4$, $R^5$, and $R^6$ are an alkylene group having 1 to 20 carbon atoms, an arylene group having 6 to 20 carbon atoms, an alkylarylene group having 6 to 20 carbon atoms, an arvyalkylene group having 6 to 20 carbon atoms, a cyclopentadienylene group, a substituted cyclopentadienylene group or an indenylene group; $X^1$ is a halogen atom; d and e are an integer of 0 to 3; and f is an inter of 0 to 2.

Representative examples of the alkyl group having 1 to 20 carbon atoms as represented by $R^4$, $R^5$ or $R^6$ are a methyl, an ethyl, a propyl, a butyl, an amyl, an isoamyl, an isobutyl, an octyl and a 2-ethylhexyl.

Representative example of the aryl, alkylaryl or arylalkyl having 6 to 20 carbon atoms are a phenyl, a tolyl, a xylyl and a benzyl.

In the general formulae (C), (D) and (E), $R^4$, $R^5$ and $R^6$ may be identical or different one another.

The multiple-nuclear catalyst is represented by the formula (F):

where M is an atom of Group IVB, $R^1$ and $R^2$ are an alkyl group having 1 to 20 carbon atoms, an aryl group having 6 to 20 carbon atoms, an alkylaryl group having 6 to 20 carbon atoms, an arylalkyl group having 6 to 20 carbon atoms, a cyclopentadienyl group, a substituted cyclopentadienyl group or an indenyl group, R7 is a multivalent radical having C1–C20 alkylene, C6–C20 arylene, C6–C20 alkylarylene, C6–C20 arylalkylene, or a polymer having a polymerization degree of 5 to 10000, X is a halogen atom, d and e are an integer of 0 to 3, and n is an integer of 3 to 1000.

The transition metal compound 3 may be used alone or in combination of two or more types. The amount of the transition metal compound 3 is not limited, but is preferably in the range of about 0.0001 to 30.0% by weight as per the supported catalyst.

The supported catalyst can contain optionally (D) alkyl aluminoxane and/or (E) alkyl aluminum compound.

In the preparation process of the supported catalyst according to the present invention, an alkyl aluminoxane compound is used, where necessary, as a component (D).

The alkyl aluminoxane compound is a product of the reaction of an alkyl aluminum and a condensation reagent such as water. The alkyl aluminoxane compound is represented by the following general formula (G):

where $R^8$ is an alkyl group having 1 to 8 carbon atoms, and j is a number of 2 to 50.

The chain structure of the component (D), alkyl aluminoxane, represented by general formula (G) is linear or cyclic.

The amount of the component (D) is not limited, but is preferably in the range of about 0 to 50% by weight as per the supported catalyst.

In the preparation process of the supported catalyst in the present invention, an alkyl aluminum compound represented by the general formula (H) is used when necessary, as a component (E).

where $R^9$ is an alkyl group having 1 to 8 carbon atoms.

The amount of the component (E) is not limited, but is preferably in the range of about 0 to 50% by weight as per the supported catalyst.

Figure 2:
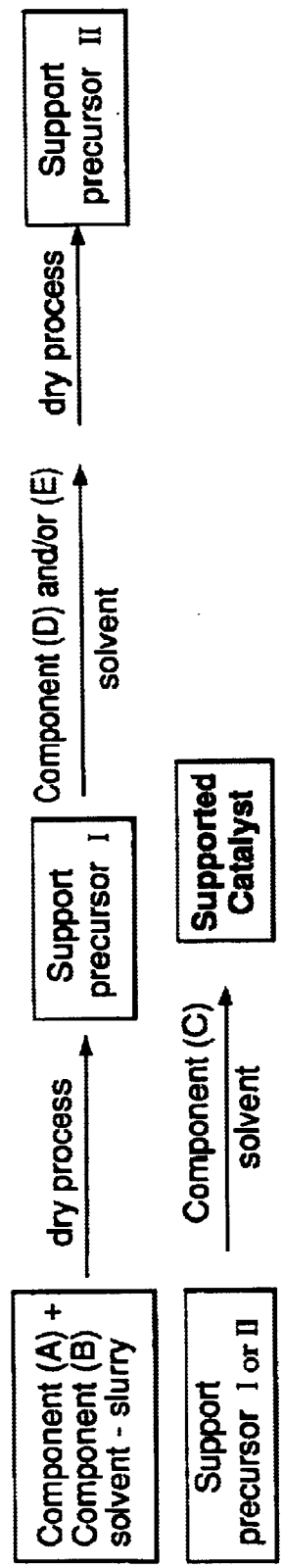
FIG. 2 is a schematic process for preparing a supported catalyst according to the present invention.

Among the components, which are described as above, for preparation of the supported catalyst according to the present invention, components (A), (B) and (C) are essential, and components (D) and (E) can be used together or individually in combination with components (A), (B) and (C) when they are necessary. FIG. 2 is a schematic process for preparing a supported catalyst according to the present invention. The reaction procedures and the addition sequences of these components for preparation of supported catalyst are not specifically limited, but those as shown in FIG. 2 are preferred.

The solvent used for preparation of the supported catalyst is not specifically limited, but aliphatic and aromatic hydrocarbon solvents are preferred, which is easily conducted by an ordinary skilled person in the art to which the present invention pertains. The reaction temperature for preparation of the supported catalyst is usually about from −100° C. to 150° C., preferably from 20 to 70° C.

The styrenic monomer is polymerized to prepare syndiotactic styrenic polymer by using the supported catalyst provided by the present invention. The styrenic monomer is represented by the formula (1):

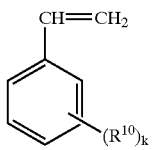

where each $R^{10}$ is individually selected from the group consisting of a hydrogen atom, a halogen atom and a substituent group which contains a carbon atom, an oxygen atom, a nitrogen atom, a sulfur atom, a phosphorus atom or a silicon atom, ad k represents an integer of 1 to 3.

The styrenic monomer can be not only homopolymerized, but also copolymerized when two or more styrenic monomers are used, by using the supported catalyst provided by the present invention.

The monomers which can be polymerized by the supported catalyst according to the present invention are not limited to the styrenic monomers. Olefin monomers represented by the general formula (J) can also be polymerized alone and copolymerized with a monomer. The copolymerization can be carried out between olefin monomers or between an olefin monomer and a styrenic monomer.

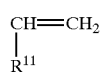

where $R^{11}$ is a hydrogen atom, or a linear or cyclic alkyl group having 1 to 20 carbon atoms.

The supported catalyst provided by the present invention is preferably used in combination with a cocatalyst for producing syndiotactic styrenic polymer. Alkyl aluminoxane (D) and/or alkyl aluminum compound (E) can be used as cocatalysts.

By using the supported catalyst provided by the present invention, the productivity of styrenic polymer is much increased and the reactor fouling was significantly reduced. The styrenic polymer powder such produced by the present invention has good flow-ability and good morphology demonstrating a great deal of industrial applicability.

The present invention will be described in more detail by the following Examples. The Examples are given only to illustrate the present invention and not intended in any way to limit the scope of the invention.

EXAMPLES 1–4

Preparation of HDPE-Catalyst Support

To a dried 250 ml flask equipped with a magnetic stirring bar, 10 g of high-density polyethylene (HDPE) powder (product by Samsung General Chemical co. Ltd. of Korea; powder size: 80~150 mesh, melt index: 0.045 g/10 min), 0.5g of SAN (styrene-acrylonitrile copolymer) (product by Cheil Industries Inc. of Korea; acrylonitrile content: 23 wt %, Mw: 90000) and 80 ml of toluene were added under a nitrogen atmosphere. The resulting slurry was allowed to stir at room temperature for 2 hours for completely dissolution of the SAN polymer, and then toluene was removed by decantation followed by vacuum. Thus, a white well-flow powder product was obtained. To the white powder, 2mmol of methyl aluminoxane (MAO) in 80 ml toluene was added at room temperature. The slurry was kept at room temperature with stirring for 30 minutes, and then toluene was removed by decantation followed by vacuum. As a result, a white finely divided solid was obtained as an HDPE-catalyst support. The aluminum content was measured to be 1.33 wt % (0.05 mmol/g) by ICP analysis.

Polymerization by Using HDPE-Catalyst Support 0.5 g of HDPE-catalyst support was weighed into a 25 ml vial in a dry box, then 0.02 mmol of pentamethyl cyclopentadienyl titanium trimethoxide (Cp*Ti(OCH$_3$)$_3$) in 15 ml toluene solution was added by syringe. The slurry was kept at room temperature for 1 hour.

To a dried 1L-glass reactor equipped with a circulation water jacket for temperature control and an anchor-paddle impeller (made of steel), 200 ml of purified styrene monomer and 3 ml of triisobutyl aluminum (60 mmol/L-SM) were added. The solution was stirred at 70° C and 400 rpm for 10 minutes, and then 0.71 ml of 2.83M methyl aluminoxane (2 mmol) toluene solution and the catalyst slurry prepared above were injected. Polymerization proceeded for 1 hour, then the resulting solution was quenched by a large amount of methanol. The polymer was filtered and dried by vacuum at 150° C. As a result, 114.8 g of powder polymer was obtained. The conversion was 63.7%, the activity was 5.74 kg/mmol-Ti-hr and the reactor fouling was 2.32 wt %.

The polymer obtained was analyzed by $^{13}$C NMR and DSC to be a highly syndiotactic polystyrene with the melting point of 270° C. The weight-average molecular weight (Mw) and molecular weight distribution (Mw/Mn) were determined by GPC to be 561,000 and 1.95, respectively.

Examples 24 were carried out in the same manner as Example 1 except that triisobutyl aluminum was used at 40, 60 and 80 mmol/L in Examples 2, 3 and 4, respectively. The resulting data were shown in Tables 1 and 2.

EXAMPLES 5–8

Preparation of sPS-Catalyst Support

To a dried 250 ml flask equipped with a magnetic stirring bar, 10 g of syndiotactic polystyrene (sPS) powder (Laboratory-made, powder size: 20~150 mesh, Mw: 1,280,000, Mw/Mn=2.95), 0.5 g of SAN (poly(styrene-co-acrylonitrile)) (product by Samsung Cheil Industries Inc., acrylonitrile content: 23 wt %, Mw: 90000) and 80 ml of toluene were added under a nitrogen atmosphere. The resulting slurry was allowed to stir at room temperature for 2 hours for completely dissolution of the SAN polymer, and then toluene was removed by decantation followed by vacuum. Thus, a white well-flow powder was obtained. To the white powder, 2 mmol of methylaluminoxane (MAO) in 80 ml toluene was added at room temperature. The slurry was kept at room temperature with stirring for 30 minutes, and then toluene was removed by decantation followed by vacuum. As a result, a white finely divided solid was obtained as an sPS-catalyst support.

Polymerization by Using sPS-Catalyst Support 0.5 g of sPS-catalyst support was weighed into a 25 ml vial in a dry box, then 0.02 mmol of pentamethyl cyclopentadienyl titanium trimethoxide (Cp*Ti(OCH$_3$)$_3$) in 15 ml toluene solution was added by syringe. The slurry was kept at room temperature for 1 hour.

To a dried 1L-glass reactor equipped with a circulation water jacket for temperature control and an anchor-paddle impeller (made of steel), 200 ml of purified styrene monomer and 3 ml of triisobutyl aluminum (60 mmol/L-SM) were added. The solution was stirred at 70° C. and 400 rpm for 10 minutes, and then 0.71 mil of 2.83M methyl aluminoxane (2 mmol) toluene solution and the catalyst slurry prepared above were injected. Polymerization proceeded for 1 hour, then the resulting solution was quenched by a large amount of methanol. The polymer was filtered and dried by vacuum at 150° C. As a result, 108.4 g of powder polymer was obtained. The conversion was 59.6%, the activity was 5.42/mmol-Ti-hr and the reactor fouling was 0.46 wt %.

The polymer obtained was analyzed by $^{13}C$ NMR and DSC to be a highly syndiotactic polystyrene with the melting point of 270° C. The weight-average molecular weight (Mw) and molecular weight distribution (Mw/Mn) were determined by GPC to be 607,000 and 2.45, respectively.

Examples 6–8 were carried out in the same manner as Example 5 except that isobutyl aluminum was used at 40, 60 and 80 mmol/L in Examples 6, 7 and 8, respectively. The resulting data were shown in Tables 1 and 2.

COMPARATIVE EXAMPLES 1–4

To a dried 1L-glass reactor, equipped with a circulation water jacket for temperature control and an anchor-paddle impeller (made of steel), 200 ml of purified styrene monomer and 3 ml of triisobutyl aluminum (20 mmol/L-SM) were added. The solution was stirred at 70° C. and 400 rpm for 10 minutes, and then 0.71 ml of 2.83M methyl aluminoxane (2 mmol) toluene solution and 0.02 mmol of homogeneous catalyst, pentamethyl cyclopentadienyl titanium trimethoxide ($Cp*Ti(OCH_3)_3$) in 15 ml toluene solution were injected. The system became highly viscous and finally became a lump about 2~3 minutes after polymerization started. The polymerization could not proceed because the system could not be agitated. The polymerization was stopped by quenching with methanol.

Comparative Examples 2–4 were carried out in the same manner as Comparative Example 1 except that triisobutyl aluminum was used at 40, 60 and 80 mmol/L in Comparative Examples 2, 3 and 4, respectively. The similar lump polymer were obtained by using the homogeneous catalyst, $Cp*Ti(OCH_3)_3$ in Comparative Example 2–4.

The polymerization conditions and resulting data were listed in Table 1.

COMPARATIVE EXAMPLE 5

Prepolymerization: To a dried 1L-glass reactor equipped with a circulation water jacket for temperature control and an anchor-paddle impeller (made of steel), 200 ml of purified styrene monomer and 8 ml of triisobutyl aluminum (32 mmol) were added. The solution was stirred at 70° C. and 400 rpm for 10 minutes, and then 0.25 ml of 2.83M methyl aluminoxane (0.72 mmol) toluene solution and 0.0072 mmol of homogeneous catalyst, $Cp*Ti(OCH_3)_3$, in 2 ml toluene solution were injected. The prepolymerization proceeded for 1 hour.

Polymerization: The polymerization started with injection of 0.16 ml of 2.83M methyl aluminoxane (0.47 mmol) and 0.0047 mmol of homogeneous catalyst, $Cp*Ti(OCH_3)_3$. 0.47 mmol of MAO and 0.0047 mmol of $Cp*Ti(OCH_3)_3$ were repeatedly injected 7 times at interval of 5 minutes until the total amount of 4 mmol MAO and 0.04 mmol of $Cp*Ti(OCH_3)_3$ (including MAO and catalyst in prepolymerization) were reached. The catalyst and MAO injection time was 30 minutes and the polymerization was allowed to proceed for another 30 minutes. The polymerization was terminated with addition of a large amount of methanol. Finally, fine polymer was obtained together with serious reactor and impeller fouling. The total yield was 121.8 g, conversion was 67.0%, reactor fouling was 25% and the activity was 1.52 kg/mmol-Ti-hr. The polymerization conditions and resulting data were listed in Tables 1 and 2.

TABLE 1

| | catalyst support | [Cat] mmol/L | [TiBA] mmol/L | Polym. Time Min | Yield % | Fouling % | Activity kg/mmol-TI-h |
|---|---|---|---|---|---|---|---|
| Example 2 | HDPE | 0.1 | 20 | 60 | 47.4 | 1.28 | 4.3 |
| Example 3 | HDPE | 0.1 | 40 | 60 | 58.3 | 1.30 | 5.3 |
| Example 4 | HDPE | 0.1 | 60 | 60 | 63.7 | 2.32 | 5.8 |
| Example 5 | HDPE | 0.1 | 80 | 60 | 54.3 | 0.80 | 4.9 |
| Example 7 | sPS | 0.1 | 20 | 60 | 35.0 | 2.15 | 3.2 |
| Example 8 | sPS | 0.1 | 40 | 60 | 38.0 | 2.17 | 3.5 |
| Example 9 | sPS | 0.1 | 60 | 60 | 59.6 | 0.46 | 5.4 |
| Example 10 | sPS | 0.1 | 80 | 60 | 48.3 | 1.02 | 4.4 |
| Comparative Example 1 | None | 0.1 | 20 | 3 | — | Lump | — |
| Comparative Example 2 | None | 0.1 | 40 | 3 | — | Lump | — |
| Comparative Example 3 | None | 0.1 | 60 | 3 | — | Lump | — |
| Comparative Example 4 | None | 0.1 | 80 | 3 | — | Lump | — |
| Comparative Example 5 | None | 0.2 | 160 | 120 | 67.0 | 25.0 | 1.5 |

Polymerization conditions: SM: 200 ml, [MAO]/[Ti] = 100, Polymerization temperature: 70° C.; rpm: 400/min.

TABLE 2

| | catalyst support | [Cat] mmol/L | [TiBA] mmol/L | Polym. Time Min | Mw × $10^{-3}$ | Mw/Mn |
|---|---|---|---|---|---|---|
| Example 2 | HDPE | 0.1 | 20 | 60 | 852 | 1.88 |
| Example 3 | HDPE | 0.1 | 40 | 60 | 666 | 2.21 |
| Example 4 | HDPE | 0.1 | 60 | 60 | 561 | 1.95 |
| Example 5 | HDPE | 0.1 | 80 | 60 | 424 | 1.93 |
| Example 7 | sPS | 0.1 | 20 | 60 | 816 | 1.98 |
| Example 8 | sPS | 0.1 | 40 | 60 | 762 | 1.90 |
| Example 9 | sPS | 0.1 | 60 | 60 | 607 | 2.45 |
| Example 10 | sPS | 0.1 | 80 | 60 | 604 | 2.09 |
| Comparative Example 5 | None | 0.2 | 160 | 120 | 358 | 1.75 |

Polymerization conditions: SM: 200 ml, [MAO]/[Ti]= 100,

Polymerization temperature: 70° C.; rpm: 400/min.

As shown in Table 1, powder polymers were obtained with the reactor fouling below 3 wt % when either an HDPE-catalyst support (Examples 2~5) or an sPS-catalyst support (Examples 7~10) was used. In contrast, despondent lump polymer was yielded when only a homogeneous catalyst (Cp*Ti(OCH$_3$)$_3$) was used in Comparative Examples 1~4. The powder polymer was yielded by using only homogeneous catalyst (Cp*Ti(OCH$_3$)$_3$) in Comparative Example 5 where pre-polymerization was employed, and feeding speed of catalyst and cocatalyst was controlled. As the results of Comparative Example 5, the productivity of sPS was much decreased together with tremendous reactor fouling (25 wt %).

The narrow molecular weight distribution showed in Table 2 indicated that even though the catalyst supports were used, the single-sited characteristic of the catalyst was not changed. Additionally, the molecular weight of the sPS polymer was in a good range and also it could be controlled by the concentration of triisobutyl aluminum (TiBA).

EXAMPLE 9

Polymerization En 10L Stirring Tank Reactor Using sPS-Catalyst Support 5 g of sPS-catalyst support was weighed into a 100 ml vial in a dry box, then 0.06 mmol of Cp*Ti(OCH$_3$)$_3$ in 15 ml toluene solution was added by syringe. The slurry was kept at room temperature for 1 hour.

A 10L Bench reactor was purged with nitrogen at 100° C. for 2 hours, and then it was cooled to 80° C. 2000 ml of purified styrene monomer and 40 mmol of triisobutyl aluminum (TiBA) in toluene solution were transferred to the reactor by nitrogen pressure. The reactor was allowed to stir at 300 rpm at 80° C. under nitrogen atmosphere for 10 minutes. 2.12 ml of 2.83M of MAO (6 mmol) in toluene solution and the catalyst slurry prepared above were injected simultaneously. The polymerization was allowed to proceed for 40 minutes, and then the polymer powder was discharged out through the bottom drain of the reactor.

The polymer powder was collected and dried by vacuum. As the results, 781.7 g of sPS powder was obtained. The conversion was 43.1% and activity was 19.2 kg/mmol-Ti-hr. The reaction conditions and resulting data are shown in Table 3.

COMPARATIVE EXAMPLE 6

A 10L Bench reactor was purged with nitrogen at 100° C. for 2 hours, and then it was cooled to 80° C. 2000 ml of purified styrene monomer and 40 mmol of triisobutyl aluminum (TiBA) in toluene solution were transferred to the reactor by nitrogen pressure. The reactor was allowed to stir at 300 rpm at 80° C. under nitrogen atmosphere for 10 minutes. 2.12 ml of 2.83M of MAO (6 mmol) in toluene solution and 0.06 mmol of Cp*Ti(OCH$_3$)$_3$ in 15 ml toluene solution were injected simultaneously. About 10 minutes after polymerization started, polymerization could not proceed because of high stirrer ampere. The reactor was opened. Completely lump-like polymer was obtained and no powder-like sPS was yielded. The reaction conditions and resulting data are shown in Table 3.

COMPARATIVE EXAMPLE 7

Prepolymerization: A 10L Bench reactor was purged with nitrogen at 100° C. for 2 hours, and then it was cooled to 80° C. 2000 ml of purified styrene monomer and 40 mmol of triisobutyl aluminum (TiBA) in toluene solution were transferred to the reactor by nitrogen pressure. The reactor was allowed to stir at 300 rpm at 70° C. under nitrogen atmosphere for 10 minutes, and then 0.83 ml of 2.83M methyl aluminoxane (2.4 mmol) toluene solution and 0.024 mmol of homogeneous catalyst, Cp*Ti(OCH$_3$)$_3$, in 2 ml toluene solution were injected. The prepolymerizatibn was proceeded for 1 hour.

Polymerization: The polymerization started with injection of 0.54 ml of 2.83M methyl aluminoxane (1.5 mmol) and 0.015 mmol of homogeneous catalyst, Cp*Ti(OCH$_3$)$_3$. The 1.5 mmol of MAO and 0.015 mmol of Cp*Ti(OCH$_3$)$_3$ were repeatedly injected 7 times at time interval of 5 minutes until total amount of 13.2 mmol MAO and 0.132 mmol of Cp*Ti(OCH$_3$)$_3$ (including MAO and catalyst in prepolymerization) were reached. The catalyst and MAO injection time was 30 minutes and the polymerization was allowed to proceed for another 1 hour. Finally, fine polymer powder was obtained together with serious reactor and impeller fouling. The total yield was 1182 g, conversion was 65.0%, reactor fouling was 25% and the activity was 3.58 kg/mmol-Ti-hr. The polymerization conditions and resulting data are shown in Table 3.

TABLE 3

| | Catalyst support | [Cat] mmol/L | [TiBA] mmol/L | Polym. time min | Yield % | Activity kg/ mmol-Ti-h |
|---|---|---|---|---|---|---|
| Example 9 | SPS | 0.030 | 20 | 40 | 43.1 | 19.2 |
| Comparative Example 6 | None | 0.030 | 20 | 10 | — | lump |
| Comparative Example 7 | None | 0.066 | 50 | 150 | 65.0 | 3.58 |

Polymerization conditions: SM: 2000 ml, [MAO]/[Ti] = 100, Polymerization temperature: 80° C.; rpm: 400/min.;

The productivity using sPS-catalyst support in Example 11 was significantly higher than that of only using the homogeneous catalyst where the method of prepolymerzation and controlled feeding speed of catalyst had to be employed in Comparative Example 7.

EXAMPLES 10~12

Preparation of Silica-Catalyst Support

To a dried 250 ml flask equipped with a magnetic stirring bar, 10 g of silica (Davison Chemical co., dried at 600° C. for 6 hours before use), 0.5 g of SAN (styrene-acrylonitrile copolymer) (product by Samsung Cheil Industries Inc. of Korea, acrylonitrile content: 23 wt %, Mw: 90000) and 80 ml of toluene were added under nitrogen atmosphere. The resultant slurry was allowed to stir at room temperature for 2 hours for complete dissolution of the SAN polymer, and then toluene was removed by decantation followed by vacuum. Thus, white well-flow powder was obtained. To the white powder, 2 mmol methyl aluminoxane (MAO) in 80 ml toluene was added at room temperature. The slurry was kept at room temperature with stirring for 30 minutes, and then toluene was removed by decantation followed by vacuum. As a result, a white finely divided solid was obtained as a silica-catalyst support.

In Examples 10, 11 and 12, the silica was calcinated at 600° C., 200° C. and 400° C., respectively.

Polymerization by Using Silica-Catalyst Support 0.9 g of silica-catalyst support of Example 10 was weighed into a 25 ml vial in a dry box, then 0.04 mmol of Cp*Ti(OCH$_3$)$_3$ in 15 ml toluene solution was added by syringe. The slurry was kept at the room temperature for 1 hour.

To a dried 1L-glass reactor equipped with a circulation water jacket for temperature control and an anchor-paddle impeller (made of steel), 200 ml of purified styrene monomer and 4 ml of triisobutyl aluminum (80 mmol/L-SM) were added. The solution was stirred at 70° C. and 400 rpm for 10 minutes, and then 1.41 ml of 2.83M methyl aluminoxane (4 mmol) toluene solution and the catalyst slurry prepared above were injected. Polymerization proceeded for 2 hour, then was quenched by a large amount of methanol. The polymer was filtered and dried by vacuum at 150° C. As a result, 122.4 g of powder polymer was obtained. The conversion was 67.3%, the activity was 1.53 kg/mmol-Ti-hr and the reactor fouling was 2.8 wt %.

The polymer obtained was analyzed by $^{13}$C NMR and DSC to be a highly syndiotactic polystyrene with the melting point of 270° C. The weight-average molecular weight (Mw) and molecular weight distribution (Mw/Mn) were determined by GPC to be 353,100 and 3.16, respectively.

The polymerization procedures were repeated for the silica-catalyst supports of Examples 11 and 12. The polymerization data are shown in Tables 4 and 5.

EXAMPLES 13~16

Polymerization by Using Silica-Catalyst Support 0.2 g silicacatalyst support of Example 10 was weighed into a 25 ml vial in a dry box, then 0.04 mmol of Cp*Ti (OCH$_3$)$_3$ in 15 ml of toluene solution was added by syringe. The slurry was kept at room temperature for 1 hour.

To a dried 1L-glass reactor equipped with a circulation water jacket for temperature control and an anchor-paddle impeller (made of steel), 200 ml of purified styrene monomer and 2 ml of triisobutyl aluminum (40 mmol/L-SM) were added. The solution was stirred at 70° C. and 400 rpm for 10 minutes, and then 1.41 ml of 2.83M methyl aluminoxane (4 mmol) toluene solution and the catalyst slurry prepared above were injected. Polymerization proceeded for 1 hour, then was quenched by a large amount of methanol. The polymer was filtered and dried by vacuum at 150° C. As a result, 104.9 g of powder polymer was obtained. The conversion was 57.7%, the activity was 2.62 kg/mmol-Ti-hr and the reactor fouling was 1.4 wt %.

The polymer obtained was analyzed by $^{13}$C NMR and DSC to be a highly syndiotactic polystyrene with the melting point of 270° C. The weight-average molecular weight (Mw) and molecular weight distribution (Mw/Mn) were determined by GPC to be 493,100 and 1.90, respectively.

Examples 14–16 were carried out in the same manner as Example 13 except that triisobutyl aluminum was used at 40, 60 and 80 mmol/L in Examples 14, 15 and 16, respectively. The resulting data were shown in Tables 4 and 5.

COMPARATIVE EXAMPLE 8

The same polymerization procedures as in Example 13~16 were repeated except that silica-supported methyl aluminoxane (sMAO) and homogeneous catalyst, Cp*Ti (OCH$_3$)$_3$, were used in stead of MAO in toluene solution and silica-supported catalysts, respectively.

To a dried 1L-glass reactor equipped with a circulation water jacket for temperature control and an anchor-paddle impeller (made of steel), 200 ml of purified styrene monomer and 3 ml of triisobutyl aluminum (60 mmol/L-SM) were added. The solution was stirred at 70° C. and 400 rpm for 10 minutes, and then 0.73 g sMAO (4 mmol), produced by Akzo Nobel, Al content: 14.8 wt %, in toluene slurry and 0.04 mmol of Cp*Ti(OCH$_3$)$_3$ in 10 ml toluene solution were injected. Polymerization proceeded for 2 hour, then was quenched by a large amount of methanol. The polymer was filtered and dried by vacuum at 150° C. As a result, 6.18 g of powder polymer was obtained. The conversion was 3.40%, the activity was 0.08 kg/mmol-Ti—hr. By GPC analysis, the polymer showed bimodal peaks at the molecular weight of 5000 and 562,000, respectively. The molecular weight and molecular weight distribution are shown in Table 5.

As shown in Table 5, Examples 10~11 indicated that silica calcination temperature did not affect behaviors of the silica-catalyst support in polymerization significantly. This well means that the intrinsic properties of silica surface become not important due to the existence of insulation polymer layer on the support surface. The molecular weight distribution of the product kept narrow and the molecular weight decreased with the increment of TiBA concentration.

TABLE 4

|  | Catalyst support | [Cat] mmol/L | [TiBA] mmol/L | Polym. Time min. | Yield % | Fouling % | Activity kg/mmol-Ti-h |
|---|---|---|---|---|---|---|---|
| Example 10 | Silica$^{a)}$ | 0.2 | 80 | 120 | 61.2 | 3.6 | 1.39 |
| Example 11 | Silica$^{b)}$ | 0.2 | 80 | 120 | 60.8 | 4.7 | 1.38 |
| Example 12 | Silica$^{c)}$ | 0.2 | 80 | 120 | 67.3 | 2.8 | 1.53 |
| Example 13 | Silica$^{c)}$ | 0.2 | 20 | 60 | 49.9 | 7.8 | 2.27 |
| Example 14 | Silica$^{c)}$ | 0.2 | 40 | 60 | 57.7 | 1.3 | 2.62 |
| Example 15 | Silica$^{c)}$ | 0.2 | 60 | 60 | 51.6 | 2.3 | 2.35 |
| Example 16 | Silica$^{c)}$ | 0.2 | 80 | 60 | 50.8 | 2.0 | 2.31 |
| Comparative Example 8 | SMAO (Al:4 mmol) | 0.2 | 60 | 120 | 3.40 | ~0 | 0.08 |

Notes:
$^{a)}$Silica calcinated at 200° C.
$^{b)}$Silica calcinated at 400° C.
$^{c)}$Silica calcinated at 600° C.
Polymerization conditions: SM: 200 ml, [MAO]/[Ti] = 100,
Polymerization temperature: 70° C.; rpm: 400/min.

TABLE 5

| | Catalyst support | [Cat] mmol/L | [TIBA] mmol/L | Polym. Time Min | Mw × $10^{-3}$ | Mw/Mn |
|---|---|---|---|---|---|---|
| Example 10 | Silica[a] | 0.2 | 80 | 120 | 405 | 2.62 |
| Example 11 | Silica[b] | 0.2 | 80 | 120 | 380 | 3.16 |
| Example 12 | Silica[c] | 0.2 | 80 | 120 | 353 | 3.16 |
| Example 13 | Silica[c] | 0.2 | 20 | 60 | 624 | 2.39 |
| Example 14 | Silica[c] | 0.2 | 40 | 60 | 493 | 1.90 |
| Example 15 | Silica[c] | 0.2 | 60 | 60 | 464 | 2.33 |
| Example 16 | Silica[c] | 0.2 | 80 | 60 | 308 | 2.32 |
| Comparative Example 8 | SMAO (Al: 4 mmol) | 0.2 | 60 | 120 | 376 | 35.5 bi-mo-dal |

Notes:
[a]Silica calcinated at 200° C.
[b]Silica calcinated at 400° C.
[c]Silica calcinated at 600° C.
Polymerization conditions: SM: 200 ml, [MAO]/[Ti] = 100, Polymerization temperature: 70° C.; rpm: 400/min.

EXAMPLES 17~20

Preparation of Silica-Supported Catalyst 10 g of silica-catalyst support of which silica was calcinated at 600° C. for 6 hours was suspended in 100 ml toluene, 2 mmol of Cp*Ti(OCH$_3$)$_3$ in 50 ml toluene solution was added by cannula. The slurry was stirred at 70° C. for 2 hours, and then, the stirrer was switched off, toluene phase became colorless. The supernatant toluene was removed by filtering and the solid was washed with toluene again at 70° C. After removal of toluene by filtering and vacuum dry, a bright-yellow finely divided powder was obtained as the silica-supported catalyst. The titanium content of the supported catalyst was calculated to be 0.2 mmol/g.

Polymerization Using Silica-Supported Catalyst

To a dried 1L-glass reactor equipped with a circulation water jacket for temperature control and an anchor-paddle impeller (made of steel), 200 ml of purified styrene monomer and 3 ml of triisobutyl aluminum (60 mmol/L-SM) were added. The solution was stirred at 70° C. and 400 rpm for 10 minutes, and then 1.41 ml of 2.83M methyl aluminoxane (4 mmol) toluene solution and 0.2 g silica-supported catalyst suspended in 15 ml toluene were injected. Polymerization proceeded for 1 hour, then was quenched by a large amount of methanol. The polymer was filtered and dried by vacuum at 150° C. As a result, 90.5 g of powder polymer was obtained. The conversion was 49.8%, the activity was 2.26 kg/mmol-Ti-hr and the reactor fouling was 3.0 wt %.

The polymer obtained was analyzed by $^{13}$C NMR and DSC to be a highly syndiotactic polystyrene with the melting point of 270° C. The weight-average molecular weight (Mw) and molecular weight distribution (Mw/Mn) were determined by GPC.

Examples 18~20 were carried out in the same manner as Example 17 except that isobutyl aluminum was used at 40, 60 and 80 mmol/L in Examples 18, 19 and 20, respectively.

The polymerization conditions and resulting data were listed in Tables 6 and 7.

COMPARATIVE EXAMPLE 9

The procedures in Example 10 and Example 17 were repeated except that the supported catalyst was prepared without using the SAN polymer. The supported catalyst was made by directly loading the metallocene catalyst (Cp*Ti(OCH$_3$)$_3$) on the MAO-treated silica surface without using the insulation polymer (SAN).

The same polymerization procedures as in Examples 17~20 were repeated except that the supported catalyst prepared above was used. As the results, no polymer was acquired, indicating decisive role of the insulation polymer (SAN) on the polymerization activity. The polymerization conditions and resulting data were listed in Tables 6 and 7.

TABLE 6

| | Silica-supported catalyst mmol/L | [TiBA] mmol/L | Polym. time min. | Yield % | Fouling % | Activity kg/mmol-Ti-h |
|---|---|---|---|---|---|---|
| Example 17 | 0.2 | 20 | 60 | 35.7 | 2.8 | 1.62 |
| Example 18 | 0.2 | 40 | 60 | 40.6 | 5.0 | 1.85 |
| Example 19 | 0.2 | 60 | 60 | 49.8 | 3.0 | 2.26 |
| Example 20 | 0.2 | 80 | 60 | 33.6 | 2.3 | 1.53 |
| Comparative Example 9 | 0.2 | 60 | 60 | 0.0 | — | — |

Polymerization conditions: SM: 200 ml, [MAO]/[Ti] = 100 ([SMAO]/[Ti] = 100 in Comparative Example 9), Polymerization temperature: 70° C.; rpm: 400/min.

TABLE 7

| | Silica-supported catalyst mmol/L | [TiBA] mmol/L | Polym. Time min. | Mw × $10^{-3}$ | Mw/Mn |
|---|---|---|---|---|---|
| Example 17 | 0.2 | 20 | 60 | 623 | 2.12 |
| Example 18 | 0.2 | 40 | 60 | 586 | 1.94 |
| Example 19 | 0.2 | 60 | 60 | 501 | 2.26 |
| Example 20 | 0.2 | 80 | 60 | 454 | 2.25 |
| Comparative Example 9 | 0.2 | 60 | 60 | | |

Polymerization conditions: SM: 200 ml, [MAO]/[Ti] = 100 ([SMAO]/[Ti] = 100 in Comparative Example 9), Polymerization temperature: 70° C.; rpm: 400/min.

As shown in Tables 6 and 7, no activity was detected by using the supported catalyst which was made by directly loading the metallocene catalyst, (Cp*Ti(OCH$_3$)$_3$), on the MAO-treated silica surface without using the insulation polymer (SAN), and there was extremely low activity when SMAO/Cp*Ti(OCH$_3$)$_3$ was used, in stead of SAN-insulated silica-supported catalyst By using the polymer-insulated supported catalyst, not only productivity of syndiotactic polystyrene was remarkably improved, but also reactor fouling was significantly reduced as compared with the homogeneous catalyst when stirring-tank reactor was employed. Polymer-insulation technique of present invention endows supported catalyst with a great industrial applicability.

In the above, the present invention was described based on the preferred embodiment of the present invention, but it should be apparent to those ordinarily skilled in the art that various changes and modifications can be added without departing from the spirit and scope of the present invention. Such changes and modifications should come within the scope of the present invention.

What is claimed is:
1. A supported catalyst for producing a syndiotactic styrenic polymer, which comprises:
   (a) a support layer;
   (b) a polymer layer coated onto the support layer, wherein the polymer layer comprises a polymer which com- prises polar groups; interacts with the surface of the support layer; and is insoluble in styrenic monomer or polymerization solvent during use of the supported catalyst during polymerization of the styrene monomers to produce syndiotactic styrene polymer; and (c) a metallocene catalyst layer;

wherein the polymer layer is located between the support layer and the metallocene catalyst layer such that the polymer layer insulates the metallocene layer from the support layer to prevent poisoning of the metallocene catalyst layer by the support layer.

2. The supported catalyst of claim 1 in which said polymer is about 0.0001 to 30% by weight of the supported catalyst.

3. The supported catalyst of claim 1 further comprising (d) an alkyl aluminoxane and/or (e) an alkyl aluminum compound.

4. The supported catalyst of claim 1 in which said polymer is selected from the group consisting of acrylonitrile-containing polymers and copolymers, hydroxyl group-containing polymers and copolymers, acrylic and acrylate polymers and copolymers, maleic anhydride-containing copolymers and maleic anhydride modified polymers, acetate containing polymers and copolymers, polyethers, polyketones, polyamide polymers and copolymers, and polyurethanes.

5. The supported catalyst of claim 4 in which said acrylonitrile-containing polymer or copolymer is selected from the group consisting of polyacrylonitrile, acrylonitrile-styrene block copolymer, styrene-acrylonitrile random copolymer, acrylonitrile-butadiene-styrene resin, acrylonitrile-butadiene random copolymer, and acrylonitrile-isoprene random copolymer.

6. The supported catalyst of claim 5 in which said styrene-acrylonitrile random copolymer has a degree of polymerization of at least 5 and contains about 0.1 to 100% by weight of acrylonitrile.

7. The supported catalyst of claim 1 in which said polymer is about 0.0001 to 99.999% by weight of the supported catalyst.

8. The supported catalyst of claim 1 in which said support layer is an organic material selected from the group consisting of poly(styrene-co-divinylbenzene) beads, starch powder and polyolefin powder.

9. The supported catalyst of claim 1 in which said support layer is an inorganic material selected from the group consisting of silica gel, alumina, silica-alumina gel, zeolites, mica powder, clays, molecular sieves, metal oxide compounds, metal halogenides, metal carbonates and metal powder.

10. The supported catalyst of claim 1 in which said metallocene catalyst layer comprises a metal compound of Group IVB.

11. A supported catalyst comprising:

a support layer;

a metallocene catalyst layer; and a polymer layer comprising polar groups, wherein the polymer layer is located between the support layer and the metallocene catalyst layer, and wherein the polar groups absorb the metallocene catalyst layer, thereby insulating the metallocene catalyst layer from poisoning by the acidic surface of the support layer.

12. The supported catalyst of claim 11 in which said polymer is selected from the group consisting of acrylonitrile-containing polymers and copolymers, hydroxyl group-containing polymers and copolymers, acrylic and acrylate polymers and copolymers, maleic anhydride-containing copolymers and maleic anhydride modified polymers, acetate containing polymers and copolymers, polyethers, polyketones, polyamide polymers and copolymers, and polyurethanes.

13. The supported catalyst of claim 12 in which said acrylonitrile-containing polymer or copolymer is selected from the group consisting of polyacrylonitrile, acrylonitrile-styrene block copolymer, styrene-acrylonitrile random copolymer, acrylonitrile-butadiene-styrene resin, acrylonitrile-butadiene random copolymer, and acrylonitrile-isoprene random copolymer.

14. The supported catalyst of claim 13 in which said acrylonitrile-containing polymer or copolymer is a styrene-acrylonitrile random copolymer that has a degree of polymerization of at least 5 and contains about 0.1 to 100% by weight of acrylonitrile.

15. The supported catalyst of claim 11 in which said polymer is about 0.0001 to 99.999% by weight of the supported catalyst.

16. The supported catalyst of claim 11 in which said support layer is an organic material selected from the group consisting of poly(styrene-co-divinylbenzene) beads, starch powder and polyolefin powder.

17. The supported catalyst of claim 11 in which said support layer is an inorganic material selected from the group consisting of silica gel, alumina, silica-alumina gel, zeolites, mica powder, clays, molecular sieves, metal oxide compounds, metal halogenides, metal corbonates and metal powder.

18. A method of preparing a supported catalyst for producing a syndiotactic styrenic polymer, which comprises:

providing a slurry comprising a support, a polymer to be coated onto the support, and a solvent;

coating the support with the polymer;

drying the slurry; and adding a metallocene catalyst and a solvent to the dried slurry to create a supported catalyst such that the polymer is located between the support and the catalyst.

19. The method of preparing a supported catalyst according to claim 18, which further comprises:

adding an alkyl aluminoxane and/or an alkyl aluminum compound to the slurry prior to the second step.

* * * * *

UNITED STATES PATENT AND TRADEMARK OFFICE
CERTIFICATE OF CORRECTION

PATENT NO.    : 6,828,270 B1
DATED         : December 7, 2004
INVENTOR(S)   : Zhang et al.

It is certified that error appears in the above-identified patent and that said Letters Patent is hereby corrected as shown below:

Title page,
Item [73], Assignee, after "Samsung Atofina", please insert -- GmBH & --.

Column 1,
Line 55, delete "At)".

Column 2,
Lines 7-8, delete
"Si-OH + HO-R-OH → Si-R-OH → Si-O-R-O...Metallocene" and replace with
-- Si-OH + HO-R-OH → Si-O-R-OH → Si-O-R-O...Metallocene --.

Column 3,
Line 32, delete "(–SiO–Si–," and replace with -- (–Si–O–Si–, --.
Lines 47-48, delete "The binuclear catalyst is represented by the following formula (C), (D) or (E):".

Column 4,
Line 32, insert a new paragraph after "supported catalyst.".
Line 35, insert a new paragraph after "organic supports.".

Column 5,
Lines 21-25, delete Formula (D)

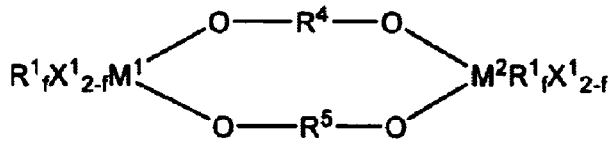

and replace as follows:

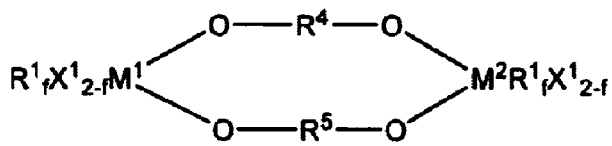

Lines 26-29, delete Formula (E):

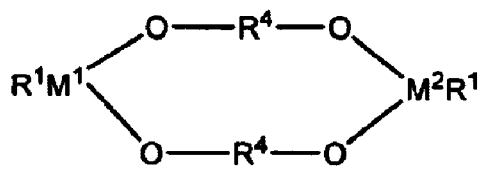

UNITED STATES PATENT AND TRADEMARK OFFICE
CERTIFICATE OF CORRECTION

PATENT NO.    : 6,828,270 B1
DATED         : December 7, 2004
INVENTOR(S)   : Zhang et al.

It is certified that error appears in the above-identified patent and that said Letters Patent is hereby corrected as shown below:

Column 5 (cont'd),
and replace as follows:

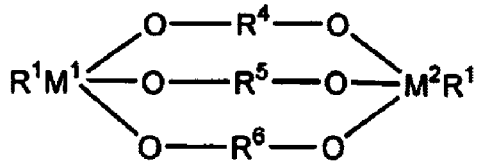

Line 32, after "Group IVB" insert -- $R^1$ --.
Line 40, delete "arvyalkylene" and insert -- arylalkylene --.

Column 8,
Line 30 delete "24" and insert -- 2-4 --.
Line 57, delete "bv" and insert -- by --.

Signed and Sealed this

Seventh Day of February, 2006

JON W. DUDAS
*Director of the United States Patent and Trademark Office*